United States Patent [19]

Weston

[11] Patent Number: 4,789,893
[45] Date of Patent: Dec. 6, 1988

[54] INTERPOLATING LINES OF VIDEO SIGNALS

[75] Inventor: Martin Weston, Banstead, United Kingdom

[73] Assignee: British Broadcasting Corporation, London, England

[21] Appl. No.: 114,649

[22] Filed: Oct. 28, 1987

[30] Foreign Application Priority Data

Oct. 31, 1986 [GB] United Kingdom ............... 8626066
May 11, 1987 [GB] United Kingdom ............... 8711084

[51] Int. Cl.[4] .................. H04N 7/12; H04N 7/01; H04N 5/14
[52] U.S. Cl. ..................... 358/136; 358/140; 358/166
[58] Field of Search ............ 358/140, 105, 160, 166, 358/167, 136, 139

[56] References Cited

U.S. PATENT DOCUMENTS

| | | | |
|---|---|---|---|
| 4,322,749 | 3/1982 | Weston | 358/139 |
| 4,335,395 | 6/1982 | Clarke | 358/11 |
| 4,393,396 | 7/1983 | Raven et al. | 358/36 |
| 4,677,461 | 6/1987 | Mizutani et al. | 358/166 |
| 4,730,217 | 3/1988 | Tonze et al. | 358/167 |

Primary Examiner—James J. Groody
Assistant Examiner—John K. Peng
Attorney, Agent, or Firm—Robert F. O'Connell

[57] ABSTRACT

Missing lines of a video signal are interpolated from the signal on three successive fields by deriving low vertical frequency components solely from the central or current field and the higher vertical frequency components partly from the lines of the current field and partly from the lines of two adjacent fields. The total contribution from the current field is unity and the total contribution from each adjacent field is zero. The circuitry for deriving and combining these components comprises an arrangement of delays, adders, subtractors and multipliers (FIG. 7). The system can be used to generate the missing lines necessary to derive a sequentially scanned video signal from an interlaced scan video signal.

9 Claims, 7 Drawing Sheets

×    o    ×              ×    o    × o    ×    o              o    ×    o
     ↓ ½
×    ⊙    ×              ×——→⊙←——×
     ↑ ½                    ½    ½
o    ×    o              o    ×    o

×    o    ×              ×    o    × a) VERTICAL INTERPOLATION    b) TEMPORAL INTERPOLATION

×    o    × o    ×    o
     ↓ ¼
×——→⊙←——×
   ¼ ↑ ¼
o    × ¼  o

×    o    × b) COMBINED

× INPUT LINES o INTERPOLATED OUTPUT LINES

⊙ 'CURRENT' OUTPUT LINES

✕ INPUT LINES.

○ INTERPOLATED OUTPUT LINES

⊙ 'CURRENT' OUTPUT LINES

× INPUT LINES

○ INTERPOLATED MISSING LINES

⊙ CURRENT MISSING LINE

INTERPOLATING LINES OF VIDEO SIGNALS

BACKGROUND OF THE INVENTION

This invention relates to a method of and apparatus for interpolating missing lines of a video signal obtained by line scanning such as a broadcast television signal.

Many television processes require the interpolation of television (TV) pictures, to create a signal like one which would have been generated if the picture had been scanned in a different way. For example digital video effects systems change the size and shape of TV pictures, and standards conversion changes the number of lines per field and/or the number of fields per second. There is also considerable potential benefit to the television viewer from display systems which increase the number of lines and/or fields in the display to reduce the visibility of line structure, flicker and twitter.

Spatial interpolation, that is, interpolation within a single field, would be relatively straightforward if it were not for the use of interlace in all current broadcast TV systems. Each field of an interlaced TV picture contains only half of the lines of a complete picture. This makes interpolation difficult because the lines of each field do not contain the full vertical resolution. The missing information is carried by the interlaced lines of the adjacent fields, but these may differ from the current field because of movement.

This specification is concerned with a method of interpolating the "missing" lines needed to convert interlaced pictures into sequentially scanned pictures. Once the missing lines have been added any further interpolation is straightforward. Any subsequent interpolation may in practice be combined with the interpolation described in this specification, but the two operations are considered separately for ease of description.

Figure 1:
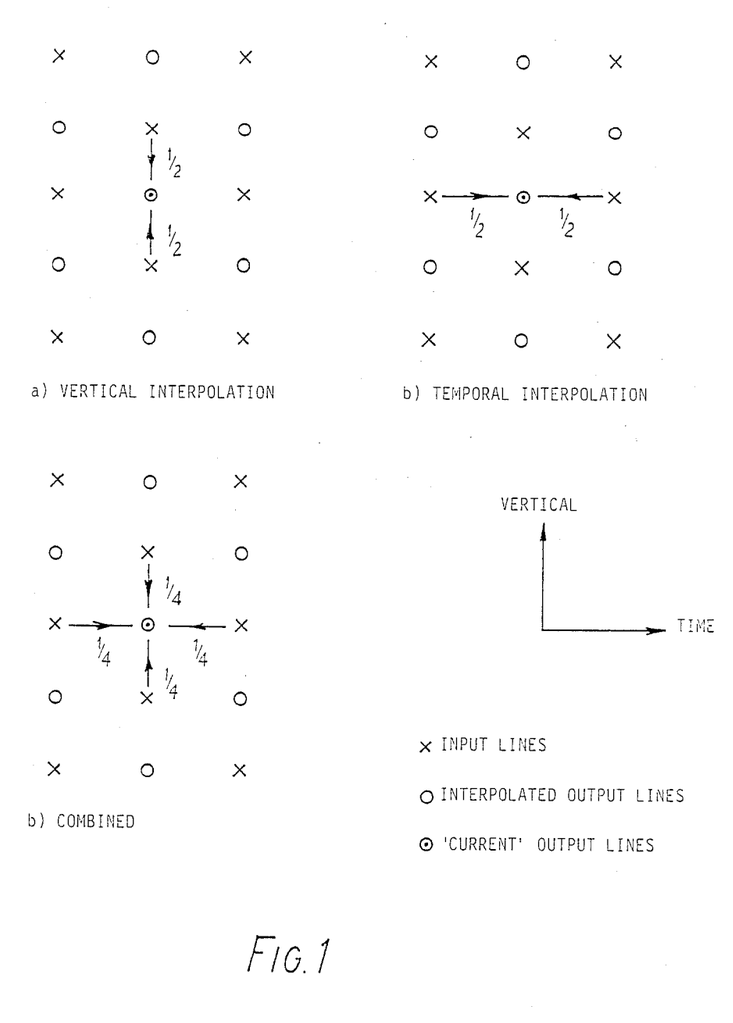
FIG. 1 shows various plots of vertical line positions against time in terms of fields for various known interpolation systems.
Figure 2:
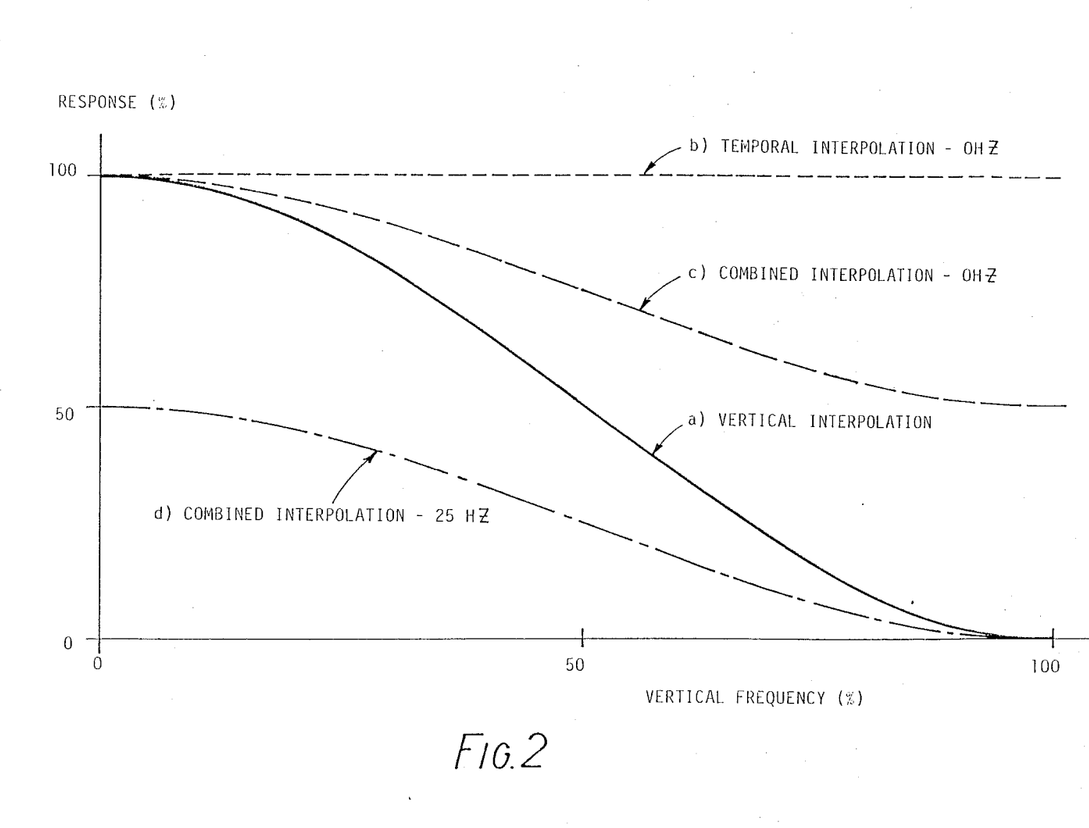
FIG. 2 shows the response to vertical detail of the various known systems of FIG. 1.

Characteristics of known methods are illustrated in FIGS. 1 and 2. In FIG. 1, the various diagrams are plots showing the vertical positions of lines on the Y-axis against time in terms of fields on the X-axis. In FIG. 1 each input line is shown by an X and each "missing" line to be generated as an output line by an O. The "current" output line is assumed to be the O with a dot in it. FIG. 2 shows the response to vertical detail of the different systems, with the response plotted on the Y-axis in terms of a percentage of perfect (100%) response, and vertical frequency plotted on the X-axis in terms of a percentage of the maximum definition of which the system is capable in the vertical direction, i.e., in the 625 line TV system used for broadcasting in the U.K., 100% is 312.5 cycles per picture height.

If the missing lines are interpolated from lines of the current field, as illustrated at (a) in FIG. 1 of the drawings, then the vertical resolution is limited, as shown at (a) in FIG. 2. If on the other hand the missing lines are interpolated from the adjacent fields, as illustrated at (b) in FIG. 1, then although the response at 0 Hz (stationary pictures) is perfect, as shown at (b) in FIG. 2, at all other temporal frequencies the response falls off, becoming zero at 25 Hz. These higher temporal frequency components are created by movement and their removal results in serious movement blur, which is roughly equivalent to doubling the integration time of the camera. Combinations of the two methods, as illustrated at (c) in FIG. 1, usually give a combination of impairments. This is shown at (c) and (d) in FIG. 2, which show the vertical frequency responses at 0 and 25 Hz respectively.

This has in the past led to the assumption that some form of adaption, to distinguish moving areas of the picture from stationary areas, is essential, so that the most appropriate form of interpolation can be used in each area. We have now appreciated that it is after all possible to devise a combined spatio-temporal interpolator which gives improved vertical resolution, without any subjectively-serious movement blur.

SUMMARY OF THE INVENTION

In the present invention missing lines of a line scanned video signal are interpolated from more than one field of the video signal. In accordance with this invention we arrange that the total contribution from the adjacent fields contains little or no low frequency components. This is achieved by ensuring that the contributions from the adjacent fields are multiplied by coefficents which sum substantially to zero.

In this way the low vertical frequencies come solely from the current field and are thus free of movement blur. Higher vertical frequency components come partly from the current field and partly from the adjacent fields. An improved vertical resolution is thus achieved, on stationary pictures, by the incorporation of information from adjacent fields. On moving pictures the contribution from the adjacent fields is out of phase and the vertical resolution is reduced (by the same amount as the increase on stationary pictures) but this loss of vertical detail on moving pictures is subjectively much less serious than the movement blur produced by previous methods.

Figure 3:
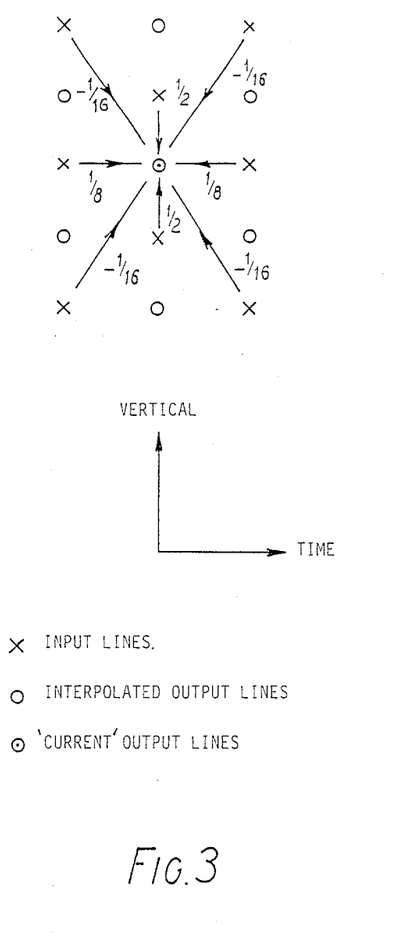
FIG. 3 is a plot similar to FIG. 1 of an arrangement embodying the invention showing vertical positions of lines on the Y-axis against time in terms of fields on the X-axis.

FIG. 3 illustrates a spatio-temporal interpolator embodying this invention. The signals from the adjacent field are multiplied by weighting coefficients which sum to zero. As shown, to form each missing output line contributions are taken in the following proportions:

½ from each of the lines above and below in the current field,

⅛ from each of the lines at the same position in the two adajacent fields, and $-1/16$ from each of the lines displaced by two picture lines in each of the two adjacent fields.

Figure 4:
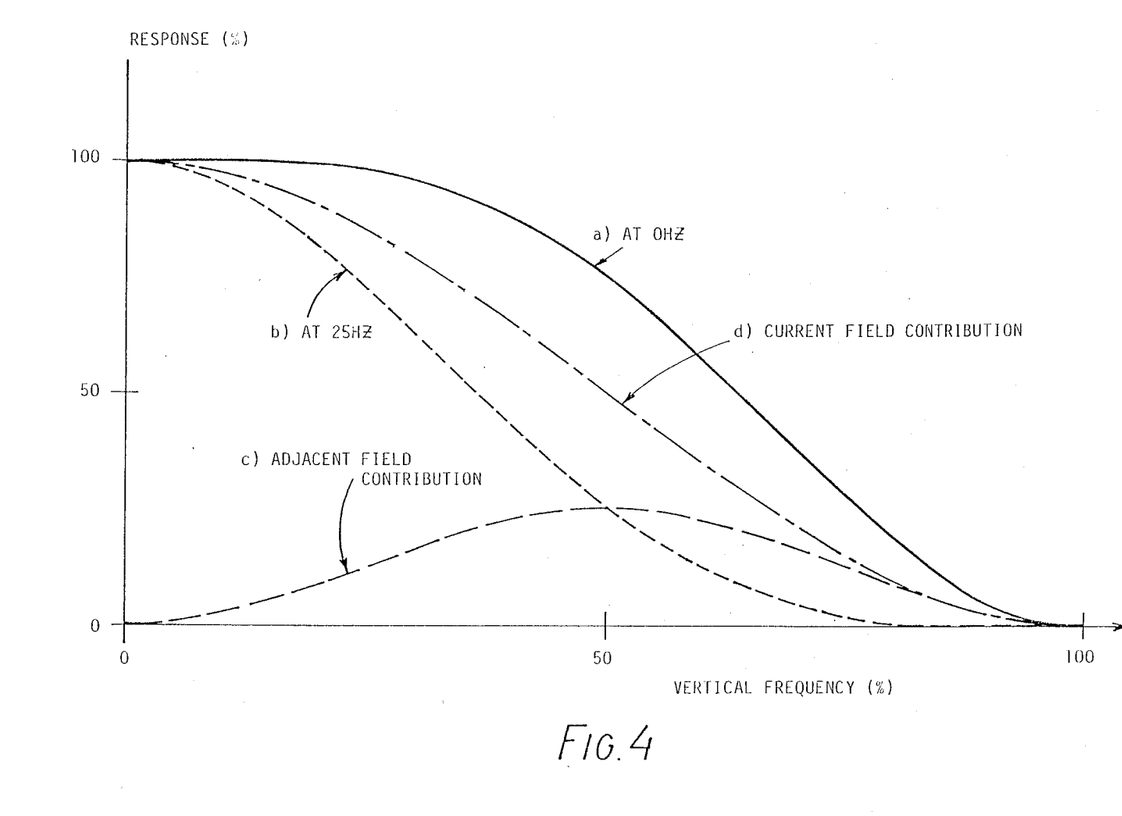
FIG. 4 illustrates the vertical frequency response of the system of FIG. 3 for different rates of movement, with the response plotted on the Y-axis against the picture content in terms of cycles per picture height on the X-axis.

Thus the nett contribution from each adjacent field is $\frac{1}{8}-(2\times 1/16)$ which is zero. The resulting vertical frequency responses at 0 and 25 Hz are shown at (a) and (b) in FIG. 4. Compared with (a) of FIG. 2 the response at 0 Hz has been improved, at the expense of the response at 25 Hz. This is because at 0 Hz the vertical frequency response, (c) in FIG. 4, of the contributions from the adjacent field is in phase with the response (d) of the contributions from the current field, whereas at 25 Hz they are in antiphase. The vertical bandwidth is thus reduced on moving objects, but this is not a very visible defect because the spatial resolution of the eye is reduced by movement. It is much more important that 100% response has been maintained at low vertical frequencies, so there is no movement blur.

Figure 5:
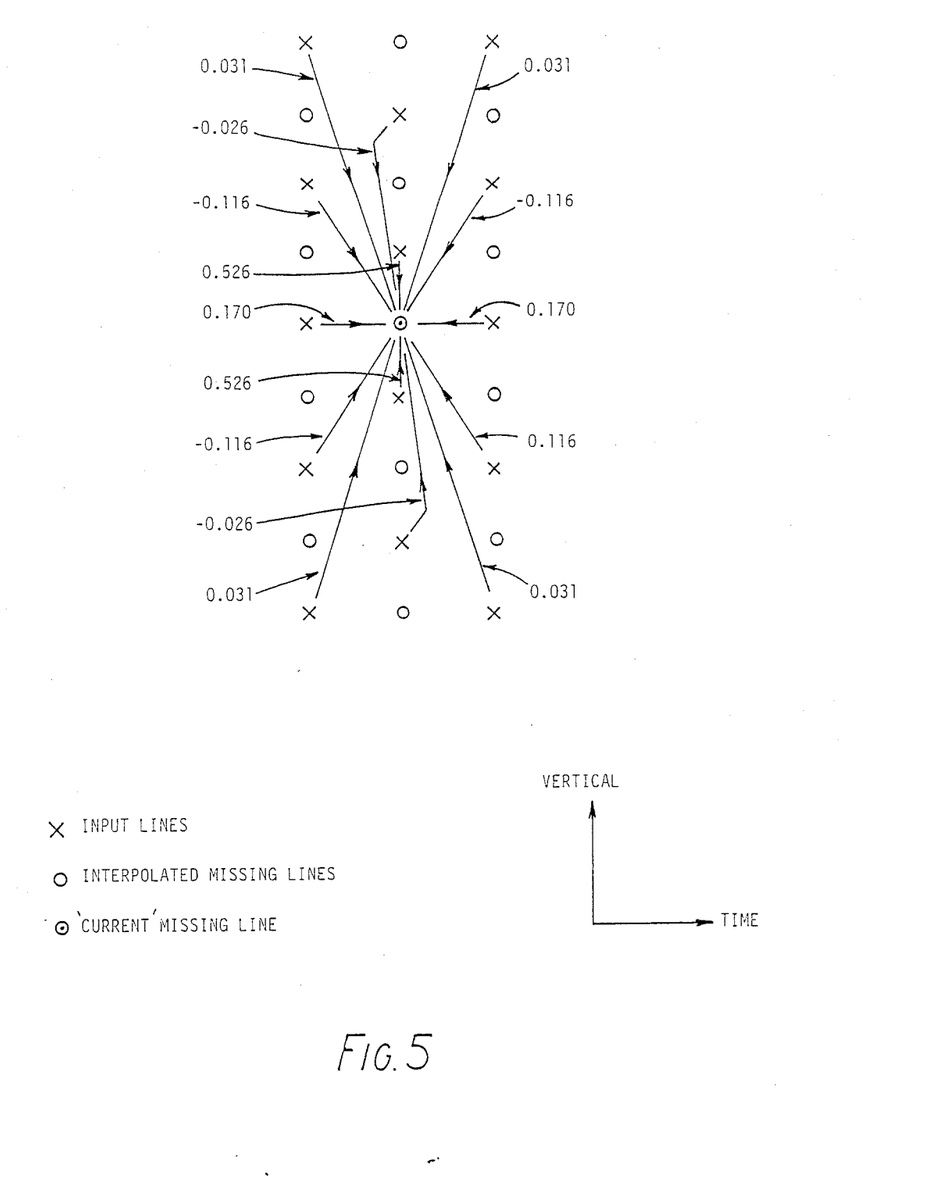
FIG. 5 is a plot similar to FIG. 3 of an alternative arrangement embodying the invention.

FIG. 3 is just one of a family of useful spatio-temporal interpolators. FIG. 5 illustrates a more complex (but not necessarily the optimum) interpolator, which combines more signals from both the current and adjacent fields, as shown on the figure. In FIG. 5 contributions are taken in the following relative proportions:

From each of the lines immediately above and below in the current field: +0.526.

From each of the lines displaced by three picture lines in the current field: −0.026.

From each of the lines at the same position in the two adjacent fields: +0.170.

From each of the lines displaced by two picture lines in each of the two adjacent fields: −0.116.

From each of the lines displaced by four picture lines in each of the two adjacent fields: +0.031.

Figure 6:
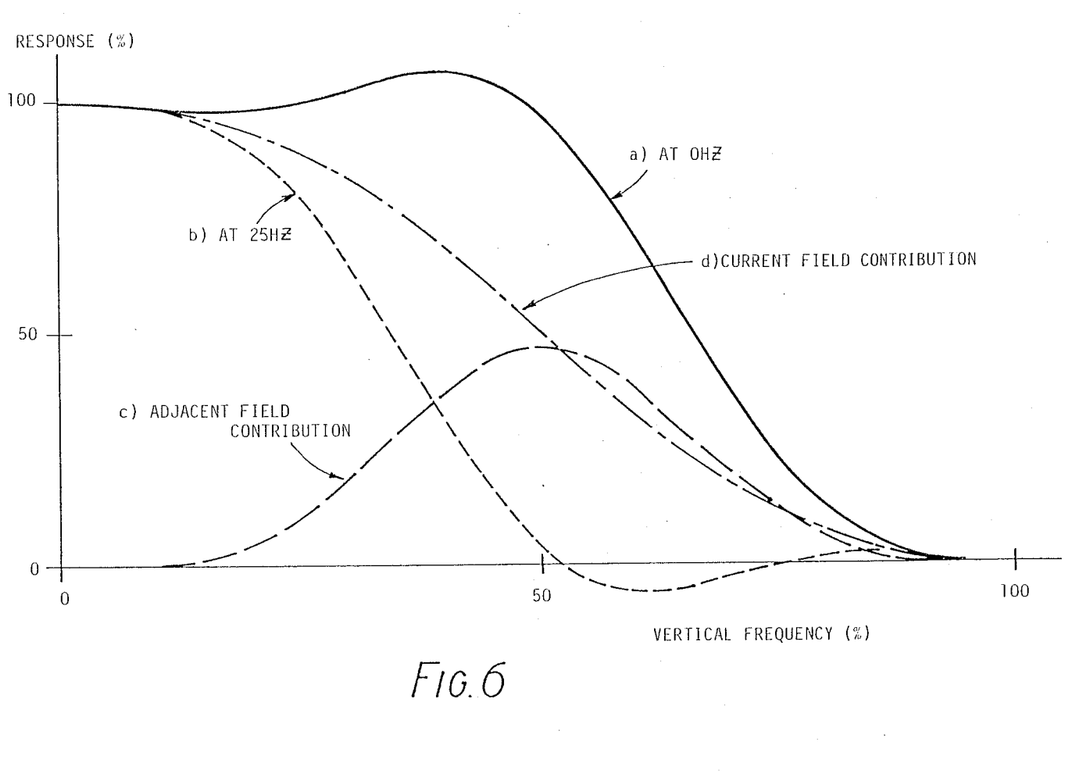
FIG. 6 illustrates the vertical frequency response of the system of FIG. 5 in similar form to FIG. 4.

The arrangement of FIG. 5 allows the flatter, sharper cut-off responses shown at (a) and (b) in FIG. 6 to be achieved. Once again the signals from the adjacent fields are multiplied by coefficents which sum to zero, so that their contribution to the vertical frequency response ((c) in FIG. 5) has no low frequency component. The low frequencies all come from the current field, whose contribution to the overall frequency response is shown at (d) in FIG. 6. Even more complex interpolators are of course possible, allowing the position and rate of cut-off to be finely controlled, to achieve the optimum performance.

Figure 7:
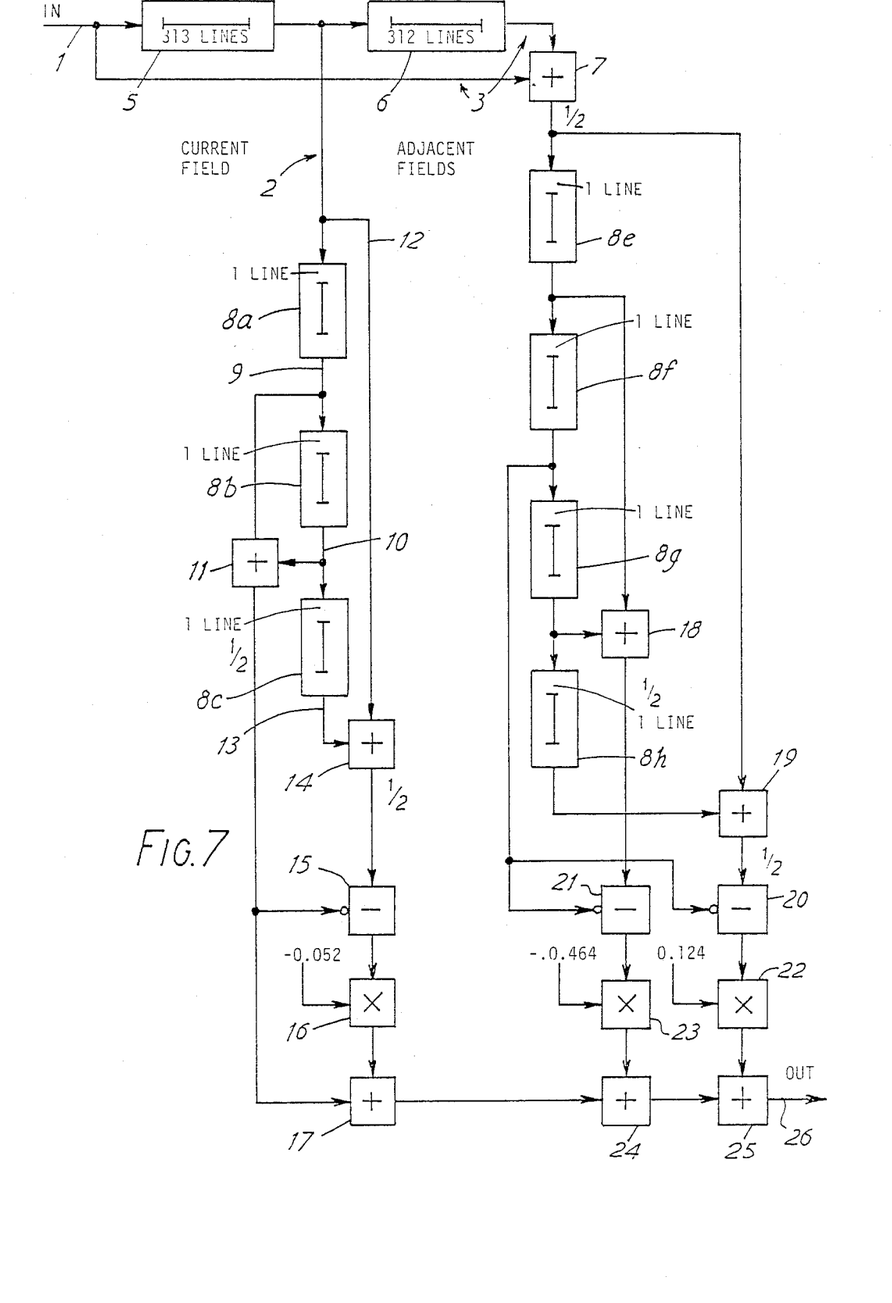
FIG. 7 is a block circuit diagram of the embodiment of the invention illustrated in FIG. 5 and FIG. 6.

Circuits to implement the arrangements of FIGS. 3 and 5 can be implemented in known manner by an appropriate combination of line delays, field delays and multipliers. A circuit implementing the interpolation arrangement of FIG. 5 is shown in FIG. 7. This example of the invention is a system for interpolating the missing lines which must be added to the interlaced input to create a 625 line sequential output.

The circuit shown in FIG. 7 has an input 1 for receiving the 625 line interlaced signal. Two delay devices 5 and 6 are connected in series to the input 1 and provide delays of 313 and 312 lines respectively. The output 2 of the first delay device 5 constitutes the current field and the input 1 and the output of the second delay device 6 constitute the succeeding and preceding adjacent fields respectively. A halving adder 7 is connected to the input 1 and the output of the second delay device 6 to add the two adjacent field signals and halve the resultant. Both these signals require the same processing and the total number of components required can thereby be reduced.

Three one-line delay devices 8a, 8b and 8c are connected in series to the output of the first delay device 5 to receive the current field signal 2. A halving adder 11 adds the outputs of delay devices 8a and 8b and divides the resultant by two. A halving adder 14 adds the outputs of delay devicees 5 and 8c and divides the resultant by two. A subtractor 15 has its non-inverting input connected to the output of adder 14 and its inverting input connected to the output of adder 11. A multiplier 16 receives the output of subtractor 15 and multiplies by a fixed factor of −0.052. An adder 17 adds the output of multiplier 16 to the output of adder 11.

Four further one-line delay devices 8e to 8h are connected in series to the output of adder 7 supplying the combined adjacent field signal. A halving adder 18 combines and halves the outputs of delay devices 8e and 8g, and a halving adder 19 combines and halves the outputs of adder 7 and delay device 8h. A subtractor 21 has its non-inverting input connected to the output of adder 18 and its inverting input connected to the output of delay device 8f, and has its output connected to a multiplier 23 which receives a fixed factor of −0.464. A subtractor 20 has its non-inverting input connected to the output of adder 19 and its inverting input connected to the output of delay 8f, and has its output connected to a multiplier 22 which receives a fixed factor of 0.124. An adder 24 adds the outputs of adder 17 and multipler 23 and an adder 25 adds the outputs of adder 24 and multiplier 22. The output 26 of the adder 25 constitutes the output of the circuit.

Thus in operation, considering first the current field signal 2, delay devices 8a and 8b will have at their outputs the two nearest lines 9 and 10 to the position that would be adopted by the missing line to be generated, see FIG. 5. These are combined in the adder 11. The lines 12 and 13 preceding and following these nearest two lines to the current missing line position are combined in halving adder 14. For low vertical frequencies where the information is effectively unchanged on successive lines the outputs of the two halving adders 11 and 14 will sum to zero in the subtractor 15. The output of this subtractor therefore comprises any high frequency components in the resultant signal and is then put through the multiplier 16 with an appropriate weighting factor. The output of the multiplier 16 is then combined with the output of the halving adder 11 in the further adder 17 to produce a combined output of low and high vertical frequency components from the current field.

The weighting factor applied by multiplier 16 is −0.052. The output of the halving adder 11 goes to the negative input of the subtractor 15. Thus, a signal of magnitude 1 is inverted and then given a weighting of −0.052 by multiplier 16. This produces a signal of resultant magnitude 0.052 from the two lines 9 and 10 nearest to the current missing line position. When this signal is combined with the output of halving adder 11 in adder 17, the total contribution from lines 9 and 10 is 1.052. This is equivalent to a contribution of 0.526 for each of lines 9 and 10. This corresponds to the weighting given to these lines in FIG. 5. Lines 12 and 13 are combined in halving adder 14, the output of which is connected to the positive input of subtractor 15. The weighting factor of −0.052 is applied by multiplier 16 thus giving a total contribution of −0.052 for these two lines. This is equivalent to a contribution of −0.026 per line as indicated on FIG. 5.

The output of adder 17 can thus be calculated in terms of the contributions made by lines 9, 10, 12 and 13:

| Line 9 | +0.526 |
| Line 10 | +0.526 |

| -continued | |
|---|---|
| Line 12 | −0.026 |
| Line 13 | −0.026 |
| | +1.000 |

This is true for cases where all four lines are identical. The addition of higher frequency components will lead to variations around unity for the total contribution made by the current field.

The adjacent field signals 3 combined in adder 7 are processed in a similar manner to the current field signal. The halving adders 18 and 19 are used to combine lines which require the same weighting factors. The total low frequency contribution required from the adjacent fields is zero. Therefore, the outputs from the single line delay devices 8e, 8g, 8h and the output from halving adder 7 are combined in the two halving adders 18 and 19 respectively. These two halving adders provide the positive inputs to two subtractors 21 and 20 respectively. The negative inputs to these two subtractors comes from the outputs of the single line delay device 8f. This is the line in the adjacent fields equivalent in position to the missing line in the current field.

For low vertical frequency components, the outputs of these two subtractors 20 and 21 will be zero. If, however, higher vertical frequencies are present a non-zero output will be produced. Weighting factors shown in FIG. 7 do not correspond directly with those shown on FIG. 5. This is because of the manner in which the fields and lines have been combined. For example, four of the adjacent field lines in FIG. 5 have a weighting factor of −0.116. In FIG. 7, the two adjacent fields are combined in halving adder 7. The lines to which the weighting factor of −0.116 must be applied are the outputs of the single line delay devices 8c and 8g. These outputs are combined in halving adder 18. This provides the positive input to subtractor 21 which in turn provides the input to multiplier 23 where a weighting factor of −0.464 is applied. This is equal to 4X−0.116 as indicated in FIG. 5. This weighting will, of course, only apply to the higher vertical frequencies, the lower frequencies having been removed by the subtractors. Thus, it will be seen that the circuit of FIG. 7 exploits the symmetries of the weighting coefficients shown in FIG. 5 to reduce the total number of components by combining the two adjacent fields and by combining pairs of lines, before multiplication.

The outputs of the two multipliers 22 and 23 are then combined with the output of adder 17 in two further adders 24 and 25 to give the missing lines at the system output 26 which must be added to the interlaced input to create a 625 line sequential output.

It is thus possible to interpolate the missing lines of interlaced TV pictures. This is achieved by taking contributions from the current field together with contributions from other, adjacent fields. The net contribution from these other fields contain no substantial low vertical spatial frequency contributions. The method illustrated gives good vertical resolution on stationary areas, and moving areas are not blurred, although they do suffer a slight loss of vertical resolution.

I claim:

1. A method of interpolating missing lines of a line scanned video signal using lines from more than one field, comprising the steps of:
    deriving the low vertical frequency components of a missing line substantially from the current field;
    deriving higher vertical frequency components of a missing line partly from the current field and partly from one or more adjacent fields; and
    combining the said high and low vertical frequency components to produce the said missing line.

2. A method according to claim 1, in which the total contribution from the current field is substantially unity.

3. A method according to claims 1, in which the total contribution from adjacent fields is substantially zero.

4. Apparatus for interpolating missing lines of a line scanned video signal using lines from more than one field, comprising;
    input means for receiving an input video signal; and
    signal deriving means coupled to the input means for deriving low vertical frequency components substantially from the current field and for deriving higher vertical frequency components partly from the current field and partly from one or more adjacent fields and for combining the said low and high frequency components.

5. Apparatus according to claim 4, in which total contribution in the output signal from the current field is substantially unity.

6. Apparatus according to claim 4, in which the total contribution in the output signal from adjacent fields is substantially zero.

7. Apparatus according to claim 4, in which the signal deriving means includes multiple-line delay devices for making signals from interlaced fields simultaneously available.

8. Apparatus according to any of claim 4, in which the signal deriving means includes single-line delay devices for making successive lines within a field simultaneously available.

9. Apparatus according to claim 4, in which the signal deriving means includes:
    subtractors arranged to separate high vertical frequency components from low vertical frequency components; and
    multipliers for applying weighting factors to the high frequency components.

* * * * *